(No Model.)
D. R. CAMERON.
COUPLING TO COMMUNICATE ROTARY MOTION BETWEEN AXES.
No. 321,579. Patented July 7, 1885.
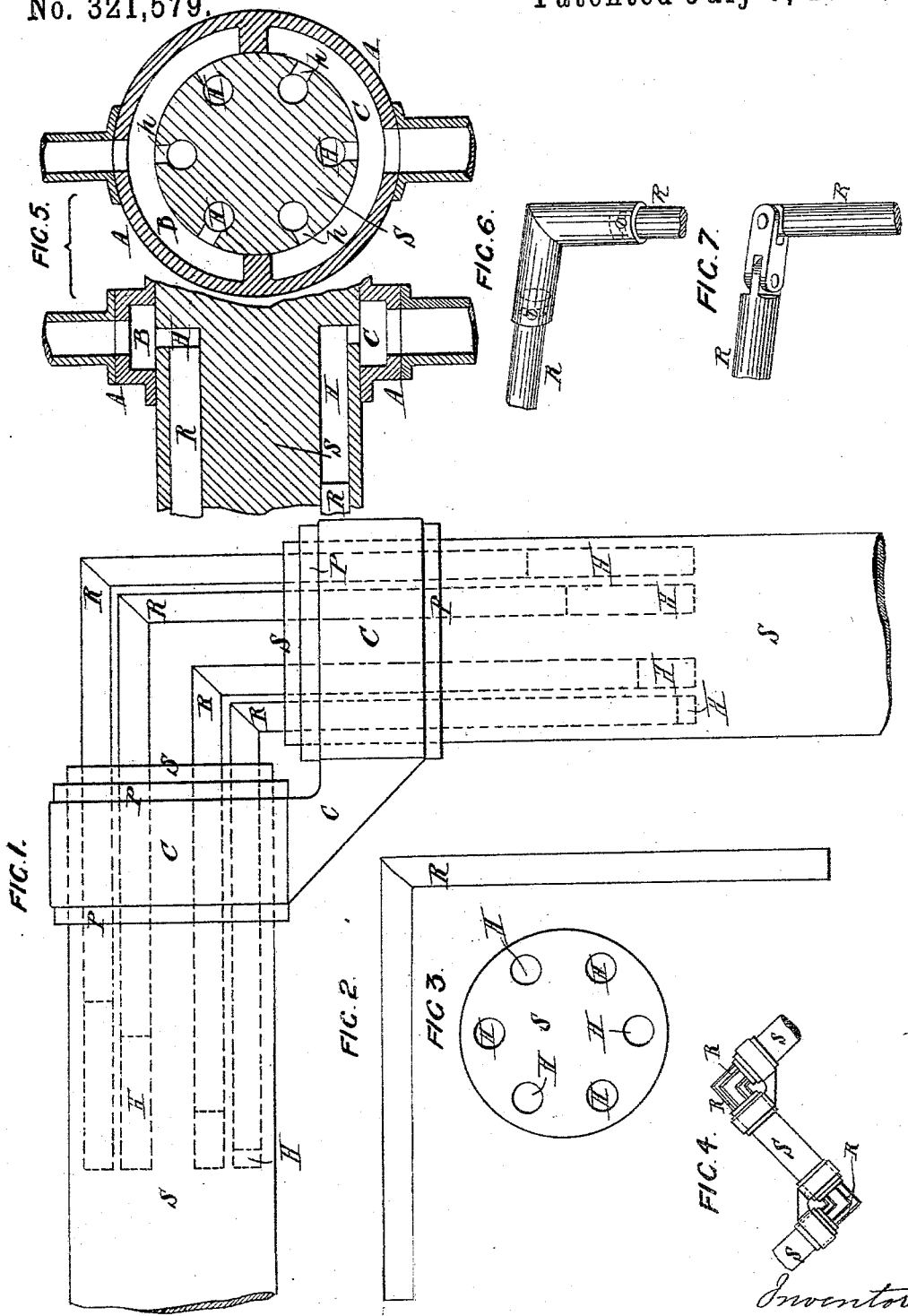

United States Patent Office.

DONALD R. CAMERON, OF MILITARY BARRACKS, SHEERNESS, COUNTY OF KENT, ENGLAND.

COUPLING TO COMMUNICATE ROTARY MOTION BETWEEN AXES.

SPECIFICATION forming part of Letters Patent No. 321,579, dated July 7, 1885.

Application filed June 2, 1885. (No model.) Patented in England October 18, 1884, No. 13,805.

*To all whom it may concern:*

Be it known that I, DONALD RODERICK CAMERON, a subject of the Queen of Great Britain and Ireland and Lieutenant-Colonel in Her Majesty's Royal Regiment of Artillery, residing at Military Barracks, Sheerness, in the county of Kent, England, have invented a certain new and useful Coupling to Communicate Rotary Motion Between Axes Inclined to One Another, (for which I have made applications for patents in Great Britain, dated 18th October, 1884, No. 13,805; France, dated 18th May, 1885; Belgium, dated 18th May, 1885; Germany, dated 19th May, 1885,) of which the following is a specification.

The object of my invention is to provide a simple and efficient means for communicating rotary motion between axes, with a steady and practically equal application and distribution of the driving-power. According to my invention the adjacent extremities of the shafts or the like, from and to which the motion is to be conveyed, have holes therein which are parallel to each other and to the axes of rotation of the shafts or the like. The holes in the one shaft or the like are situated relatively to the axis of the shaft or the like exactly as are the holes in the other shaft or the like relatively to its axis. In these holes are placed plungers or rods which slide longitudinally therein. The said plungers or rods are hinged or bent, angled, kneed, or jointed to the angle corresponding to that at which the axes, from and to which motion is to be conveyed, are inclined. If either shaft or the like be now rotated, the said rods or plungers will cause the other shaft or the like to revolve with it, the rods moving to or fro longitudinally in the holes in the two shafts or the like.

Resistance from compression of air in the cylinders may be obviated by providing external escape-channels or by connecting the piston-holes with one another internally, whereby the tendency to compression of air by the inward stroke of one piston-rod is exactly counterbalanced by tendency to expansion of the air by the outward stroke of the opposite rod, so that the movement of the rods causes neither compression nor expansion of the air in the piston-holes.

The arrangement described may be employed in connection with any number of shafts or the like situated at any suitable or required angle to each other, the said shafts being supported by any suitable bearings or supports. Of course it follows that if power be applied directly to the rods so that they be moved longitudinally, the shafts or the like will have a rotatory movement imparted to them.

In order that the invention may be fully understood, I will describe the accompanying drawings, in which—

Figure 1 shows two shafts connected by my improved coupling. Fig. 2 shows a pair of rods which I employ. Fig. 3 is a face view of one of the shafts. Fig. 4 shows the application of two pairs of rods and two couplings. Fig. 5 shows a longitudinal section and a transverse of a modification. Fig. 6 shows a pair of rods hinged or jointed. Fig. 7 shows a pair of rods with universal joint.

I have shown at Fig. 1 in plan a coupling according to my invention as applied to axes at right angles to each other; but it is to be understood that I do not limit myself to this or other particular angle, as the motion may be similarly conveyed from and to axes situated at other relatively inclined positions to each other, the rods which act as the coupling being kneed or angled to a similar inclination, or hinged or swivel-jointed, as shown in Fig. 6, or universal-jointed, as shown in Fig. 7, so as to adapt themselves to any practicable angle. S are the shafts or other revolving parts of mechanism from and to which the motion is to be conveyed. H are the holes formed in the adjacent ends of the said shafts or revolving parts S, and R are the angled rods which are inserted in and capable of movement backward and forward along the said holes. The parts S are shown as being mounted in and steadied by collars C rigidly connected to one another or to any suitable support, longitudinal movement of the axes being prevented by rings P, fixed to the parts S; or an axle bent like one of the rods, R, may be passed centrally through the shafts or parts S, to act as a support therefor.

Fig. 2 shows one of the rods separately, and Fig. 3 is a face view of one of the parts S, showing the holes H therein.

Fig. 4 shows two of the couplings applied to one piece of mechanism, for it will be understood that the couplings may be used with more than two shafts or rotating parts to carry on the rotating motion from one to the other through any desired angle.

Fig. 5 illustrates the action of the apparatus when steam or other pressure is applied to drive the rods directly instead of tangentially, by the intervention of a belt or toothed gearing or crank. The collar A is divided into an inlet-passage, B, and outlet or exhaust passage, C, the said passages communicating by passages $h$ with the holes H, in which the rods R slide. The inlet-passage B is so situated that it is in communication by the passages $h$ with the holes of such of the rods as are moving outward, while the holes H of those of the rods moving inward are in communication with the exhaust-passage C by means of the passages $h$. As the shaft or part S revolves, the steam or motive agent is alternately admitted to and exhausts from each of the holes H, as will be readily understood by reference to the drawings.

A similar arrangement may be used simultaneously to drive the rods moving inward, the steam-passage for this purpose being situated at the opposite end of the stroke of the rods, which in this case are fashioned as ordinary steam-pistons, and by reversing the direction of the current of steam the direction of rotation will be reversed.

I claim—

1. A coupling or connection for communicating, conveying, or transmitting rotary motion between axes at an angle or inclination to each other, wherein the essential feature is the arrangement of rods or their equivalents angled to correspond with the relative angles, or hinged or jointed to accommodate themselves to the varying angles of the axes between which motion is communicated, conveyed, or transmitted, the said rods or the like being capable of moving longitudinally to accommodate themselves to the varying distances during rotation of the revolving shafts or parts with which they are used, substantially as hereinbefore described.

2. A coupling comprising a pair of shafts having holes in their adjacent ends, and rods jointed together in pairs, end to end, and sliding in said holes.

In testimony whereof I have signed my name to this specification in presence of two subscribing witnesses.

D. R. CAMERON,
*Lt. Col. R. A.*

Witnesses:
CHAS. MILLS,
CHAS. JAS. JONES,
*Both of 47 Lincoln's Inn Fields, London.*